United States Patent
Marupaduga et al.

(10) Patent No.: US 10,623,070 B1
(45) Date of Patent: Apr. 14, 2020

(54) BASE STATION SELECTION BASED ON QUANTITY OF MIMO LAYERS SUPPORTED

(71) Applicant: Sprint Spectrum L.P., Overland Park, KS (US)

(72) Inventors: Sreekar Marupaduga, Overland Park, KS (US); Rajveen Narendran, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/397,305

(22) Filed: Apr. 29, 2019

(51) Int. Cl.
  *H04B 7/06* (2006.01)
  *H04B 7/0456* (2017.01)
  *H04B 7/024* (2017.01)
  *H04W 36/00* (2009.01)
  *H04B 17/336* (2015.01)
  *H04W 36/30* (2009.01)

(52) U.S. Cl.
  CPC ........... *H04B 7/0473* (2013.01); *H04B 7/024* (2013.01); *H04B 7/0632* (2013.01); *H04B 17/336* (2015.01); *H04W 36/0083* (2013.01); *H04W 36/30* (2013.01)

(58) Field of Classification Search
  CPC ...... H04B 7/024; H04B 7/046; H04B 7/0632; H04B 7/0473; H04B 17/336; H04B 7/0697; H04W 88/08; H04W 72/0406; H04W 88/10; H04W 36/0083; H04W 36/30; Y02D 70/1262; Y02D 70/20
  See application file for complete search history.

(56) References Cited

U.S. PATENT DOCUMENTS

2018/0255493 A1\* 9/2018 Wu .................. H04W 8/22

\* cited by examiner

*Primary Examiner* — Rahel Guarino

(57) ABSTRACT

A method and apparatus for controlling base station selection for service of a user equipment device (UE). When the UE is within coverage of a first base station and within coverage of a second base station, a determination could be made as to whether the UE should be served by the first base station or rather by the second base station, with the determination being based at least on a comparison of (i) maximum number of multiple-input-multiple-output (MIMO) layers that the first base station supports per UE with (ii) maximum number of MIMO layers that the second base station supports per UE. Action could then be taken to cause the UE to be served in accordance with the determination.

20 Claims, 5 Drawing Sheets

BASE STATION SELECTION BASED ON QUANTITY OF MIMO LAYERS SUPPORTED

BACKGROUND

A cellular wireless system typically includes a number of base stations that are configured to provide wireless coverage areas, such as cells and cell sectors, in which user equipment devices (UEs) such as cell phones, tablet computers, tracking devices, embedded wireless modules, and other wirelessly equipped communication devices (whether or not user operated), can operate. In turn, each base station could be coupled with a core network having nodes that that provides connectivity with one or more transport networks, such as the public switched telephone network (PSTN) and/or the Internet for instance. With this arrangement, a UE within coverage of the system could engage in air interface communication with a base station and could thereby communicate via the base station with various remote network entities or with other UEs served by the base station.

Such a system could operate in accordance with a particular radio access technology, with air-interface communications from the base stations to UEs defining a downlink or forward link and air-interface communications from the UEs to the base stations defining an uplink or reverse link.

In accordance with the radio access technology, each coverage area could operate on a carrier, which could be frequency division duplex (FDD), defining separate frequency channels for downlink and uplink communication, or time division duplex (TDD), with a single frequency channel multiplexed over time between downlink and uplink use. Further, on the downlink and uplink, the carrier could be structured to define various physical channels for carrying information between the base stations and UEs. For example, the air interface could be divided over time into frames, with each frame being divided in turn into subframes and timeslots, and the carrier bandwidth could be divided over frequency into subcarriers, which could be grouped within each timeslot to define physical resource blocks (PRBs) in which the subcarriers can be modulated to carry data.

Over the years, the industry has embraced various generations of radio access technologies, in a continuous effort to increase available data rate and quality of service for end users. These generations have ranged from "1G," which used simple analog frequency modulation to facilitate basic voice-call service, to "4G"—such as Long Term Evolution (LTE), which facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive-MIMO, beamforming, and/or other features, to support higher data rates and countless applications, such as mission-critical services, enhanced mobile broadband, and massive Internet of Things (IoT).

OVERVIEW

Under these or other radio access technologies, MIMO technology can enable a base station to engage in air interface communication concurrently on multiple different radio-frequency (RF) propagation paths, or MIMO "layers," with multiple layers possibly occupying the same air interface resources (e.g., PRBs) as each other. To facilitate this, the base station could be equipped with a MIMO antenna array, comprising multiple transmit antennas and multiple receive antennas. By suitably weighting and precoding transmissions by particular antennas in the array, the base station can then output separate but concurrent transmissions for receipt by its served UEs.

MIMO service could be used in a "single-user MIMO" (SU-MIMO) configuration to increase the data rate of transmission to a single UE, by multiplexing communications to the UE onto multiple separate layers using the same air interface resources as each other. For instance, when a base station has data to transmit to a UE, the base station could time-division-multiplex the data into multiple data streams, the base station could modulate the data streams onto the same PRBs as each other, and the base station could output the modulated data streams onto separate antenna ports for concurrent transmission on separate respective propagation paths to the UE. In practice, the UE may have two or more antennas, and the UE may estimate the channel distortion at each of its antennas and use the estimates to separately compute and uncover each of the base station's transmit signals. In theory, SU-MIMO could thus increase the data rate of communication to a UE by a multiple equal to the number of propagation paths, without requiring additional air interface resources.

In dense urban markets and other areas, wireless service providers may face a need to provide an increased extent of MIMO service. In particular, in such areas, a provider may serve a great many UEs or may otherwise need to support high aggregate throughput, but the provider may have limited available spectrum, such as a limited number of PRBs per timeslot. To help overcome that limitation, the provider may equip its base stations with a massive-MIMO antenna array.

While a traditional MIMO antenna array may include on the order of 2 to 8 antennas, a massive-MIMO antenna array would include many more antennas, perhaps on the order of tens, hundreds, or even thousands of antennas. For instance, a representative massive-MIMO antenna array could include 128 antennas, of which 64 might be configured as transmit antennas and the other 64 might be configured as receive antennas. With this arrangement, depending on how many transmit antennas are used per layer, the massive-MIMO antenna array might support providing many co-existing MIMO layers of transmission.

For SU-MIMO transmission, however, a base station may be limited in terms of the maximum number of MIMO layers on which the base station could transmit per-UE. This limitation may be a matter of base-station design and/or configuration. For instance, transmitting on a greater number of layers may require the base station to engage in certain functions to provide the greater number of separate data streams. Further, certain base stations made by certain manufacturers or made at certain times may be configured by policies for various reasons to limit the maximum number of MIMO layers that they can support per UE.

In practice, the maximum number of MIMO layers that a base station supports providing per UE may be defined by one or more transmission modes that the base station is configured to support. For instance, transmission mode #8 (TM8) provides for transmission on 2 MIMO layers to a UE, whereas transmission mode #9 (TM9) provides for transmission on 4 MIMO layers to a UE. As to these modes, a base station might support both TM8 and TM9, so that the base station could provide transmission on up to 4 MIMO layers per UE. Or a base station might support TM8 and not TM9, so that the base station could provide transmission on only up to 2 MIMO layers per UE.

When a UE is within coverage of multiple base stations, the UE could evaluate reference signals broadcast by each base station to determine which base station provides the UE with the strongest coverage. And the UE could then engage in a process to connect with and be served by that determined base station. For instance, the UE might engage random-access signaling and Radio Resource Control (RRC) signaling with the base station to establish an RRC connection between the UE and the base station. And if appropriate, the UE could engage in attach signaling via the base station with a core-network control entity to be authenticated and to trigger setup for the UE of an access network bearer and radio data bearer through which the UE could engage in data communication.

The base station could then serve the UE in an RRC-connected mode. For instance, when the base station receives packet-data to be transmitted to the UE, the base station could buffer the data and, when possible, could allocate particular downlink PRBs to carry blocks of the data to the UE and could accordingly transmit the blocks of data to the UE in the allocated PRBs. Further, the base station may serve multiple such RRC-connected UEs at once and may apply a scheduling algorithm to fairly allocate the base station's PRB resources for carrying data as necessary to the various UEs.

The present disclosure addresses a scenario where a UE is within coverage of multiple base stations that support different maximum number of MIMO layers per UE than each other. In that scenario, as noted above, the UE might compare the coverage strength of the various base stations and may opt to connect with the base station that provides the UE with the strongest coverage. However, this basis for selecting a base station does not take into account what the base station's maximum number of MIMO layers supported per UE is, such as whether the base station supports up to 4 MIMO layers per UE (e.g., per TM9) or whether the base station supports only up to 2 MIMO layers per UE (e.g., per TM8).

Given candidate base stations whose coverage strengths at the UE are comparable, it may be useful for a UE to base its selection of a base station on a comparison of the base station's respective maximum number of MIMO layers supported per UE. For instance, given a choice between base stations that have comparable signal strengths, it may be useful for the UE to select one of the base stations on grounds that the selected base station supports a greater maximum number of MIMO layers per UE than the other base station supports.

Having a UE select a base station on grounds that the base station supports a greater maximum number of MIMO layers per UE than another base station could enable the UE to be served with that greater maximum number of MIMO layers, which may advantageously help provide the UE with a higher peak data rate.

Further, similar processing could be applied when a base station is serving a UE and the UE could continue being served by that base station or could handover to be served by a target base station of one or more candidate target base stations.

In that situation, the UE and/or its serving base station could decide whether or not the UE should hand over, based at least on a comparison of the serving base station's maximum number of MIMO layers supported per UE with at least one target base station's maximum number of MIMO layers supported per UE. Alternatively or additionally, the UE and/or its serving base station could select a target base station to which the UE should handover, with the selecting being based at least on a determination that the selected target base station supports a greater maximum number of MIMO layers per UE than one or more other potential targets base stations. The UE could then be served accordingly, likewise possibly providing the UE with the benefit noted above.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
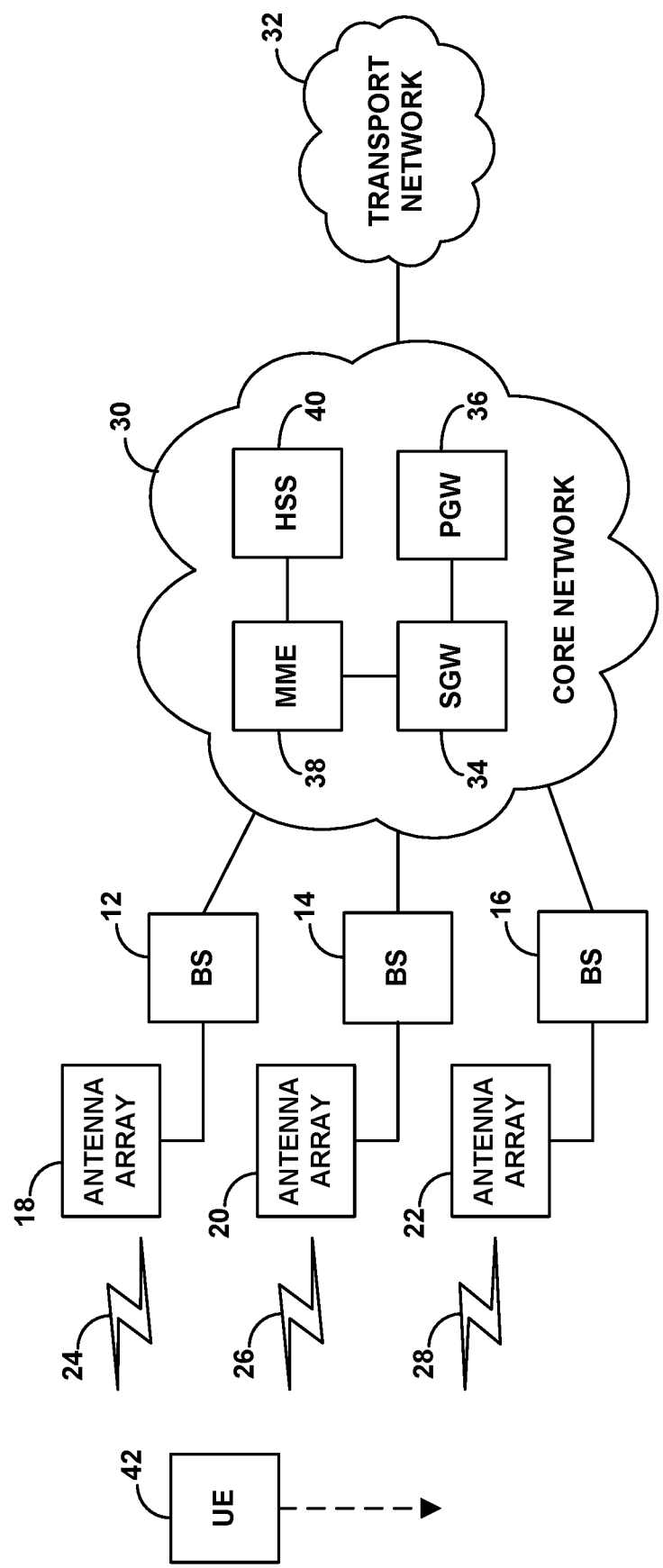
FIG. 1 is a simplified block diagram of a wireless communication system in which various disclosed features can be implemented.

Referring to the drawings, as noted above, FIG. 1 is a simplified block diagram of an example wireless communication system in which various disclosed features can be implemented. It should be understood, however, that numerous variations from this and other disclosed arrangements and operations are possible. For example, elements or operations could be added, removed, combined, distributed, or otherwise modified. In addition, operations described as being performed by one or more entities could be implemented in various ways, such as by a processor executing instructions stored in non-transitory data storage, along with associated circuitry or other hardware, for instance.

As shown in FIG. 1, the example wireless communication system includes three base stations 12, 14, 16 each having a respective antenna array 18, 20, 22 through which to provide a respective coverage area 24, 26, 28. Each base station could be a macro base station of the type configured to provide a wide range of coverage, with its antenna array mounted on a tower or other tall structure, or could take other forms, such as a small cell base station, a femtocell base station, or the like, configured to provide a smaller range of coverage.

Further, each base station could be configured to operate according to a 4G, 5G, or other radio access technology. And each base station could be configured to provide service on one or more carriers, each of which could be FDD or TDD as noted above and could thus have, on at least the downlink, a defined center frequency and bandwidth.

Figure 2:
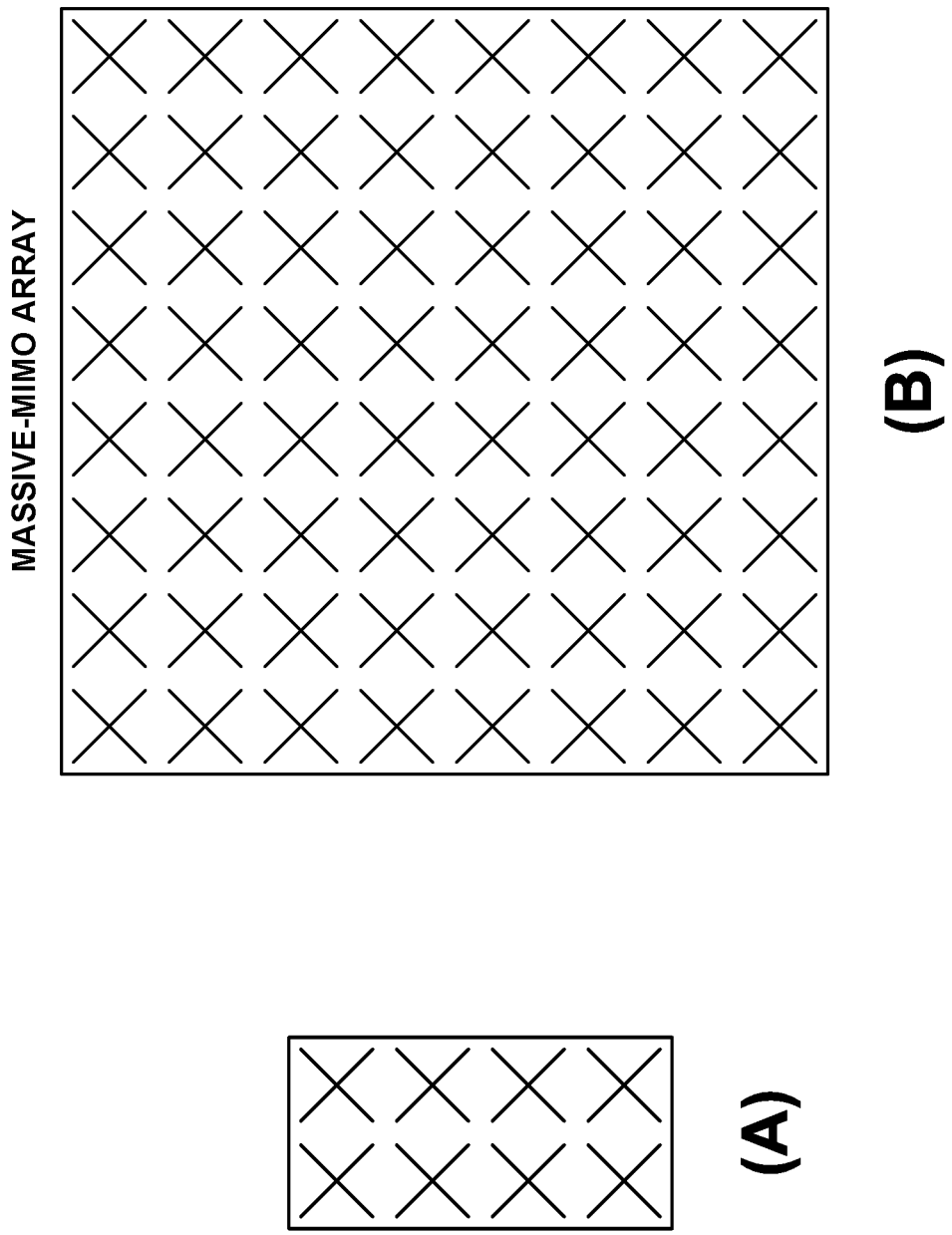
FIG. 2 is a simplified diagram of an example massive-MIMO antenna array that could be implemented according to the disclosure.

As noted above, each base station's antenna array could comprise multiple transmit antennas and multiple receive antennas. FIG. 2 depicts two examples of such an antenna array.

In FIG. 2, each illustrated X represents two antennas (or antenna elements), one with positive polarization and one with negative polarization. With each such arrangement, some of the antennas might be configured as transmit (downlink) antennas, and others might be configured as receive (uplink) antennas. For instance, all of the antennas with positive polarization might be configured as transmit antennas, and all of the antennas with negative polarization might be configured as receive antennas.

In particular, FIG. 2A illustrates an example antenna array having two columns of antennas with each column including four antennas with positive polarization and four antennas with negative polarization, so that the array might be configured to have eight transmit antennas and eight receive antennas. And FIG. 2B illustrates a massive-MIMO array having eight columns of antennas with each column including eight antennas with positive polarization and eight antennas with negative polarization, so that the array might be configured to have 64 transmit antennas and 64 receive antennas. Other array configurations are possible as well.

Base stations 12, 14, 16 each are shown interfaced with a core network 30, which could provide connectivity with an external transport network 32. The core network could be a packet-switched network, such as an Evolved Packet Core (EPC) network or a Next Generation Core (NGC) network, among other possibilities, allowing packet-based communication between nodes on the core network. In an alternative arrangement, the base stations could be interfaced with different core networks than each other.

In an example implementation as shown, the core network 30 includes a serving gateway (SGW) 34, a packet data network gateway (PGW) 36, a mobility management entity (MME) 38, and a home subscriber server (HSS) 40. In practice, each base station could have an interface with the SGW, the SGW could have an interface with the PGW, and the PGW could provide connectivity with the transport network 32. Further, each base station could have an interface with the MME, and the MME could have an interface with the SGW and the HSS.

With this arrangement, the SGW and PGW could cooperatively provide user-plane connectivity between each base station and the transport network, to enable UEs served by the base stations to engage in communication on the transport network. And the MME could operate as a controller to carry out operations such as coordinating UE attachment and setup of user-plane bearers. Further, the HSS could include or have access to a data store containing UE capabilities and service profile data and can work with the MME to facilitate UE authentication.

As discussed above, the air interface between each base station and UEs within its coverage could be structured to define various air interface resources.

For instance, in the time domain, the air interface could define a continuum of 10-millisecond (ms) frames, each divided into ten 1-ms subframes, and each subframe could be further divided into a number of timeslots, each additionally divided into symbol time segments. And in the frequency domain, the bandwidth of each carrier on which the base station operates could be divided into subcarriers with specified subcarrier spacing on the order of 15 to 240 kHz. With this arrangement, the air interface on each carrier would define an array of resource elements each occupying a subcarrier and symbol time segment, and the base station and UEs could communicate with each other through modulation of the subcarriers to carry data in those resource elements.

Further, particular groupings of resource elements on the air interface could be grouped together to define the PRBs discussed above. In an example implementation, each PRB could span one timeslot in the time domain and a group of subcarriers in the frequency domain. Depending on the carrier bandwidth, the air interface could thus support a certain number of such PRBs across the bandwidth of the carrier within each timeslot.

In addition, certain resource elements on the downlink and uplink could be reserved for particular control-channel or shared-channel communications.

For instance, on the downlink, certain resource elements per subframe (or per downlink subframe in TDD) could be reserved to define a downlink control region for carrying control signaling such as scheduling directives and acknowledgements from the base station to UEs. And other resource elements per subframe could be reserved to define a shared channel in which PRBs could carry scheduled data communications from the base station to UEs.

Further, in certain subframes, a group of resource elements centered on the center frequency of each carrier could be reserved to carry synchronization signals that UEs could detect as a way to discover coverage of the base station on the carrier and to establish frame timing. And in certain subframes, a group of resource elements also centered on the center frequency of the carrier could be reserved to define a broadcast-channel for carrying system information messages, such as master information block (MIB) and system information block (SIB) messages that WCDs could read to obtain operational parameters such as carrier bandwidth and other information. Further, certain resource elements distributed in a predefined pattern throughout the carrier bandwidth per subframe could be reserved to carry reference signals that UEs could measure as a basis to evaluate coverage strength and quality and to provide channel estimates to facilitate precoding, beamforming, or the like.

On the uplink, on the other hand, certain resource elements per subframe (or per uplink subframe in TDD) could be reserved to define an uplink control region for carrying control signaling such as access requests, channel-quality reports, scheduling requests, and acknowledgements, from UEs to the base station. And other resource elements per subframe could be reserved to define a shared channel in which PRBs could carry scheduled data communications from UEs to the base station. Further, still other resources on the uplink could be reserved for other purposes as well, such as for carrying uplink reference signals or the like.

FIG. 1 further shows a representative UE 42 that is initially within coverage of base stations 12 and 14.

In operation, UE 42 could initially scan for coverage and could discover coverage of these two base stations. For instance, the UE could be provisioned with a list of center frequencies of carriers and could scan those frequencies in search of a broadcast synchronization signal indicating the presence of a carrier, and the UE could thereby detect coverage of both base station 12 and base station 14 (e.g., as respective cells). The UE could then read the MIB broadcast by each such base station to determine the base station's respective carrier bandwidth. And the UE could then evaluate the reference signal broadcast by each base station, to gauge coverage strength. For example, the UE could determine respectively per base station a signal-to-interference-plus-noise (SINR) ratio or other measure, perhaps a reference signal receive power (RSRP) and/or a reference signal receive quality (RSRQ).

The UE may thereby determine that the coverage the UE has from base station 12 is stronger than the coverage the UE has from base station 14. For instance, the UE might determine that its coverage strength from base station 12 is −70 decibel-milliwatts (dBm) and its coverage strength from base station 14 is −80 dBm. Comparing these coverage strengths, the UE could therefore decide to connect with the stronger base station, base station 12.

Accordingly, the UE could then engage in a process to connect with base station 12. For instance, as noted above, the UE could engage in random access signaling and RRC signaling with base station 12 to establish an RRC connection with the base station. And as noted above, if appropriate, the UE could then further engage in attach signaling via the base station with the MME, triggering setup for the UE of an access network bearer and radio data bearer through which the UE could engage in data communication.

As further noted above, base station 12 could then serve the UE in an RRC-connected mode. For instance, when the base station receives packet-data over the UE's access network bearer for transmission to the UE, the base station could buffer the data and when possible can coordinate transmission of the data to the UE. In particular, for each of possibly multiple transport-blocks of the data, the base station could allocate downlink PRBs to carry the data. The base station could then transmit to the UE a downlink control information (DCI) message that specifies the allocated PRBs and could transmit the data to the UE in those PRBs, and the UE could thus receive the data transmitted in those PRBs.

As indicated above, the present disclosure provides for a UE further basing its selection of a base station on the base station's maximum number of MIMO layers supported per UE. For instance, once the UE has detected that it is within coverage of base stations 12 and 14 and perhaps once the UE has determined that its coverage strengths from both of these candidate base stations are comparable, such as that both are sufficiently high to support serving the UE, the UE could then compare the base stations' respective maximum number of MIMO layers supported per UE and, based at least on this comparison, could select one of the base stations to connect with.

This process assumes that each of various base stations is configured to support a particular maximum number of MIMO layers per UE, which, as discussed above, may be a design and/or configuration limitation.

To enable the UE to select a base station based on the base station's maximum number of MIMO layers supported per UE, each base station could broadcast or otherwise provide an indication (e.g., specification) of its respective maximum number of supported MIMO layers per UE, perhaps as an indication of one or more supported transmission modes. For example, each base station could be configured to broadcast this indication within the base station's MIB message. Thus, when a UE detects coverage of a base station and reads the base station's MIB message to determine carrier bandwidth or the like, the UE could further read the base station's MIB message to determine the base station's maximum number of MIMO layers supported per UE.

In an example implementation, base station 12 may support up to just 2 MIMO layers per UE, whereas base station 14 may support up to 4 MIMO layers per UE. Thus, when the UE is considering which of base stations 12, 14 to connect with, perhaps conditional on and after having determined that its coverage strengths from the two base stations are comparable, the UE could determine the base stations' respective maximum numbers of MIMO layers supported per UE. And based on base station 14 having a higher maximum number of MIMO layers supported per UE than base station 12, the UE could select base station 14 to connect with. The UE could then engage in signaling to connect with base station 14, and base station 14 could then serve the UE.

Optimally through this process, the UE may be able to be served by base station 14 with MIMO on 4 layers. Namely, base station 14 may be able to transmit to the UE concurrently on 4 MIMO layers, providing the UE with a separate data stream respectively per layer, which could provide the UE with increased peak data rate. Similar functionality may be supported for uplink MIMO as well.

Once the UE is served by base station 14, possibly as a result of the UE having determined that base station 14 supports a higher maximum number of MIMO layers per UE than base station 12, the UE might be in a situation where the UE could hand over from being served by base station 14 to being served by another base station. Here, as noted above, the question of up to how many MIMO layers a base station supports per UE could come into play as a basis to decide whether the UE should hand over and/or to select a target base station to which the UE should hand over.

For example, when served by base station 14, at issue may be whether the UE should hand over from being served by base station 14 to being served by base station 12. In this situation, again perhaps given that the UE has comparable signal strengths from base stations 12 and 14, the decision may for the UE to not hand over from base station 14 to base station 12, because base station 14 supports a lower maximum number of MIMO layers per UE than base station 12.

This decision could be made and carried out by the UE and/or by the UE's serving base station 14.

For instance, the UE could determine the maximum number of MIMO layers supported per UE respectively for each of base stations 12 and 14 and could thereby determine that base station 14 has a higher maximum number of MIMO layers supported per UE than base station 12. In response to this determination, the UE could therefore forgo triggering handover to base station 12, such as by forgoing reporting to its serving base station 14 that the UE has detected sufficiently strong coverage of base station 12.

Alternatively, perhaps after having received a report from the UE indicating that the UE has detected sufficiently strong coverage of base station 12 as a possible target for handover, base station 14 could refer to base-station neighbor data to determine the maximum number of MIMO layers supported per UE by base station 12 or could determine this in another manner, perhaps reported by the UE to base station 14. Base station 14 could then compare its own maximum number MIMO layers supported per UE with the maximum number of MIMO layers that base station 12 supports per UE. And based on this comparison, base station 14 could thereby determine that it's maximum number of MIMO layers per UE is greater than the maximum number of MIMO layers per UE supported by base station 12. Therefore, base station 14 could decide to not process handover of the UE from being served by base station 14 to being served by base station 12.

Of course, if the event the coverage strength discrepancy gets too significant, base station 14 may then decide to process handover of the UE to base station 12. Further, in an alternative scenario, if base station 12 had supported a higher maximum number of MIMO layers per UE than base station 14, then, on at least that basis, base station 14 could have decided to process handover of the UE to base station 12.

As another example scenario, when the UE is being served by base station 14, at issue may be whether the UE should hand over to be served instead by base station 12 or rather should hand over to be served instead by base station 16. This situation may arise if the UE is moving out of coverage of base station 14 and into coverage of both base stations 12 and 16. Here, by way of example, we can assume that base station 12 supports up to 2 MIMO layers per UE, and base station 16 supports up to 4 MIMO layers per UE. Further, it may be the case that the UE's coverage strength from base station 14 is becoming threshold low and that the UE is detecting sufficient coverage strength from both base stations 12 and 16, though perhaps somewhat stronger coverage from base station 12.

In this situation, the decision may for the UE to hand over to base station 16 rather than to be 12, with the decision being based on the fact that base station 16 supports a higher maximum number of MIMO layers per UE than base station 12.

And here again, this decision could be made and carried out by the UE and/or by the UE's serving base station 14.

For example, even though the UE has detected sufficiently strong coverage from both base stations 12 and 16, the UE could decide, based on a comparison of the base stations' respective maximum numbers of MIMO layers supported per UE (and thus based on a determination that base station 16 supports a higher maximum number of MIMO layers per UE than base station 12), to report to its serving base station 14 just the detected coverage of base station 16 as a potential handover target. Base station 14 could then process handover of the UE to that reported base station 16.

Alternatively, the UE may report to its base station 14 that the UE has detected threshold strong coverage of both base stations 12 and 16, and the base station 14 could then decide, based on a comparison of those base stations' respective maximum numbers of MIMO layers supported per UE (based on a determination that base station 16 supports a higher maximum number of MIMO layers per UE than base station 12), to process handover of the UE to base station 16 rather than to base station 12. Therefore, base station 14 could likewise process handover of the UE to base station 16.

Figure 3:
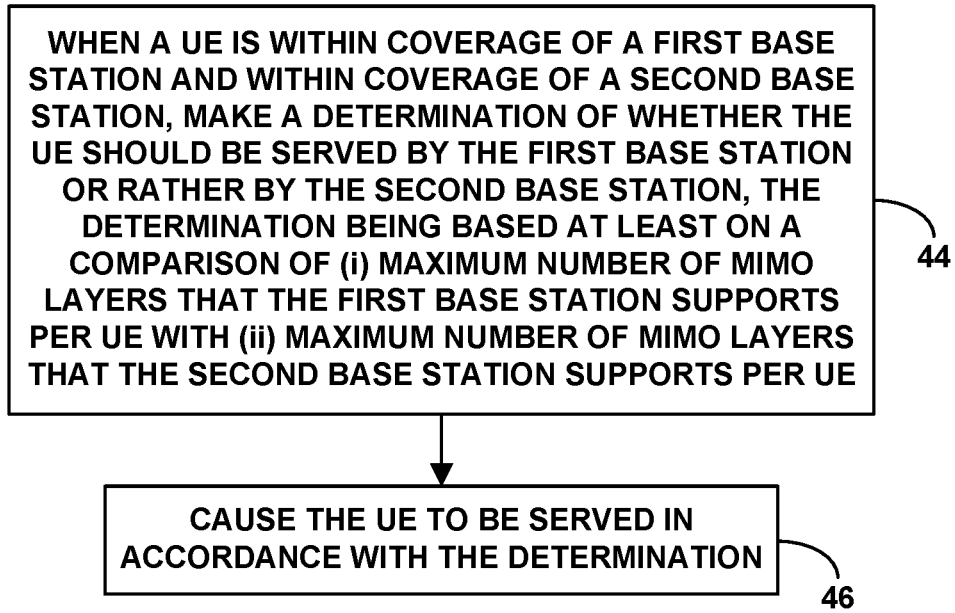
FIG. 3 is a flow chart depicting example operations in accordance with the disclosure.

FIG. 3 is a flow chart depicting an example method that can be carried out in accordance with the present disclosure to base station selection for service of a UE.

As shown in FIG. 3, at block 44, the example method includes, when the UE is within coverage of a first base station and within coverage of a second base station, making a determination of whether the UE should be served by the first base station or rather by the second base station, the determination being based at least on a comparison of (i) maximum number of MIMO layers that the first base station supports per UE with (ii) maximum number of MIMO layers that the second base station supports per UE. And at block 46, the method includes causing the UE to be served in accordance with the determination.

In line with the discussion above, the act of making the determination of whether the UE should be served by the first base station or rather by the second base station could involve determining that the second base station supports a higher maximum number of MIMO layers per UE than the first base station and, based at least on determining that the second base station supports a higher maximum number of MIMO layers per UE than the first base station, determining that the UE should be served by the second base station rather than by the first base station. And this determination could be made even when the UE has stronger detected coverage from the first base station than from the second base station.

Further in line with the discussion above, this method could be carried out at least by the UE, possibly with the assistance or involvement of one or more other entities.

As such, as discussed above, the UE could receive from the first base station (e.g., in a broadcast from the first base station) a first indication of the maximum number of MIMO layers that the first base station supports per UE (i.e., per UE that would be served by the first base station if and when the base station serves one or more UEs). Further, the UE could receive from the second base station (e.g., in a broadcast from the second base station) a second indication of the maximum number MIMO layers that the second base station supports per UE (i.e., per UE that would be served by the first base station if and when the base station serves one or more UEs). And the UE could then perform the comparison based on those received first and second indications.

In addition, as discussed above, this method could be carried out when the UE is seeking initial connectivity, in which case causing the UE to be served in accordance with the determination could involve the UE establishing an initial connection with the second base station rather than with the first base station, so that the UE will be served in a connected mode by the second base station rather than by the first base station.

Alternatively, the method could be carried out when the UE is served by the first base station or the second base station, in which case the determination of whether the UE should be served by the first base station or rather by the second base station could be a determination of whether the UE should hand over between the first base station and the second base station.

Still alternatively, the method could be carried out when the UE is served by a third base station, in which case the determination of whether the UE should be served by the first base station or rather by the second base station could be a determination of whether the UE should hand over from being served by the third base station to being served by the first base station or rather should hand over from being served by the third base station to being served by the second base station.

As further discussed above, the method could be carried out at least a base station currently serving the UE, possibly with the assistance or involvement of one or more other entities.

For instance, the base station currently serving the UE could be the first base station or second base station, in which case the act of making the determination could involve determining whether the UE should hand over between the first base station and the second base station. Alternatively, the base station currently serving the UE could be a third base station, in which case the act of making the determination could involve determining whether the UE should hand over from being served by the third base station to being served by the first base station or rather should hand over from being served by the third base station to being served by the second base station.

In addition, as discussed above, the base station currently serving the UE could make use of neighbor data to facilitate performing the comparison.

Figure 4:
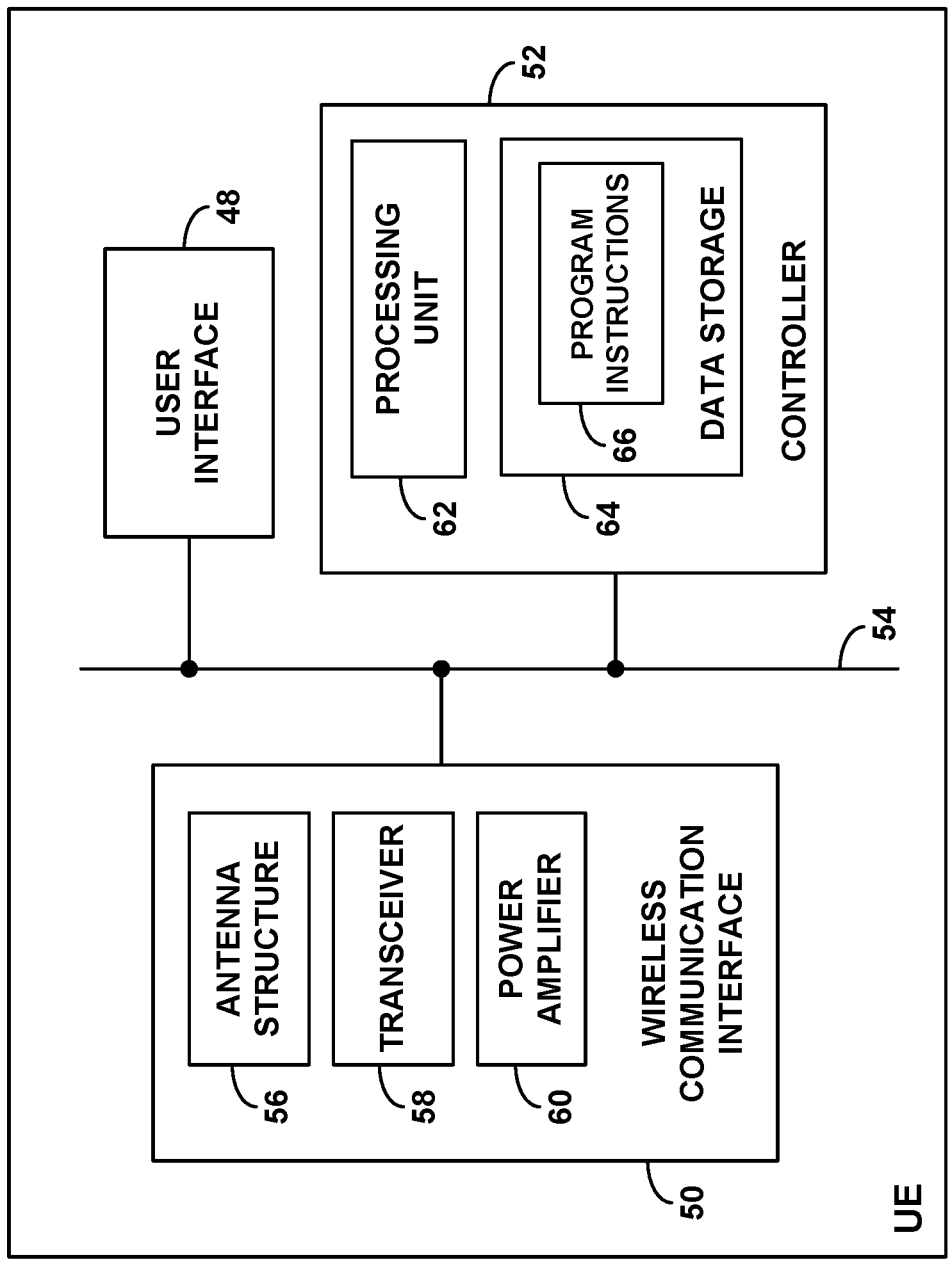
FIG. 4 is a simplified block diagram of an example UE operable in accordance with the disclosure.

FIG. 4 is a simplified block diagram of a UE that could operate to carry out features described herein such as the method shown in FIG. 3 for instance. As shown, the example UE includes a user interface 48, a wireless communication interface 50, and a controller 52, all of which may be communicatively linked together by a system bus, network, or other connection mechanism 54 and/or could be integrated together or distributed in various ways.

In this example arrangement, the user interface 48 (which might be omitted if the UE is not user operated) could include input and output components that facilitate user interaction with the UE. The wireless communication interface 48 could then include an antenna structure 56, a transceiver 58, and a power amplifier 60, among one or more other RF components, through which the UE is configured to engage in air interface communication.

And the controller 52 could comprise control logic to cause the UE to carry out particular UE operations described herein. For instance, the controller 60 could include at least one processing unit 62 (e.g., one or more general purpose microprocessors and/or dedicated processing units), non-transitory data storage 64 (e.g., one or more volatile and/or non-volatile storage components, such as magnetic, optical, or flash storage), and program instructions 66 stored in the non-transitory data storage and executable by the at least one processing unit 62 to cause the UE to carry out the operations, to facilitate initial base station selection and/or a handover decision for example.

Figure 5:
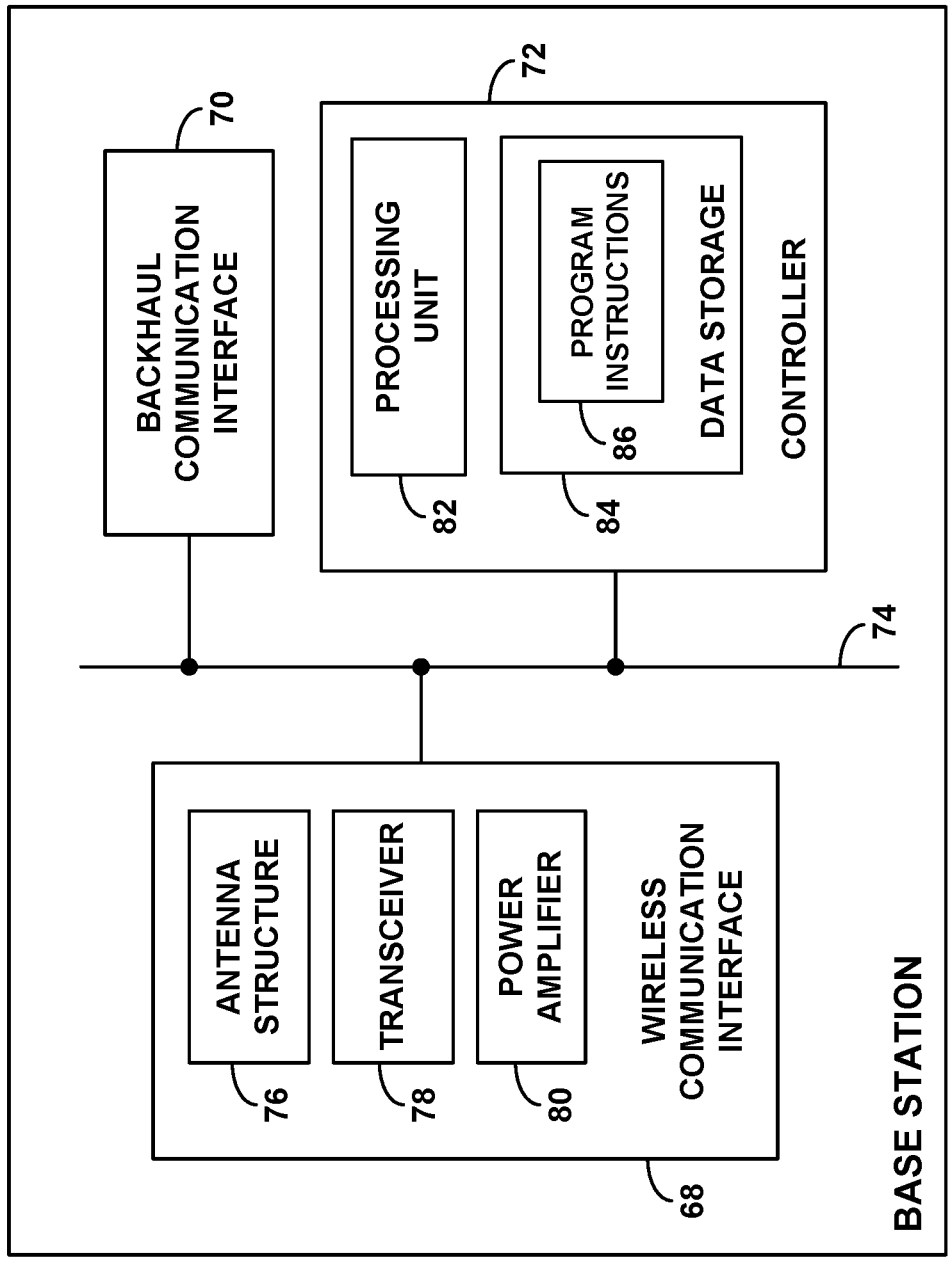
FIG. 5 is a simplified block diagram of an example base station operable in accordance with the disclosure.

Various features discussed above can be implemented in this context, and vice versa. Finally, FIG. 5 is a simplified block diagram of an example base station that could operate to carry out features described herein, also such as the method shown in FIG. 3 for instance. As shown, the example base station includes a wireless communication interface 68, a backhaul communication interface 70, and a controller 72, which could be integrated or communicatively linked together by a system bus, network, or other connection mechanism 74 and/or could be integrated together or distributed in various ways.

The wireless communication interface 68 could include an antenna structure (e.g., a MIMO antenna array, possibly a massive-MIMO array) 76, a transceiver 78, and a power amplifier 80, among one or more other RF components, to cooperatively facilitate air interface communication with UEs served by the base station, the air interface defining resources for carrying data over the air interface. And the backhaul communication interface 70 could include a wireless and/or wireless network communication module configured to support communication on a core access network such as that shown in FIG. 1 for instance.

Controller 72 could then be configured to carry out various base station operations described herein. For instance, the controller could comprise at least one processing unit 82 including one or more processors (e.g., one or more general purpose microprocessors and/or dedicated processing units), non-transitory data storage 84 (e.g., one or more volatile and/or non-volatile storage components, such as magnetic, optical or flash storage), and program instructions 86 stored in the non-transitory data storage and executable by the at least one processing unit to cause the base station to carry out the operations.

In line with the discussion above, for example, the controller of the base station could be configured to control handover of a UE served by the base station, by carrying out operations including (i) when the UE is within coverage of the base station and within coverage of at least one neighboring base station, making a handover determination based on consideration of maximum number of MIMO layers supported per UE, and (ii) controlling handover of the UE in accordance with the handover determination.

Here too, various features discussed above can be implemented in this context, and vice versa.

Exemplary embodiments have been described above. Those skilled in the art will understand, however, that changes and modifications may be made to these embodiments without departing from the true scope and spirit of the invention.

We claim:

1. A method for controlling base station selection for service of a user equipment device (UE), the method comprising:

when the UE is within coverage of a first base station and within coverage of a second base station, making a determination of whether the UE should be served by the first base station or rather by the second base station, wherein the determination is based at least on a comparison of (i) maximum number of multiple-input-multiple-output (MIMO) layers that the first base station supports per UE with (ii) maximum number of MIMO layers that the second base station supports per UE; and causing the UE to be served in accordance with the determination.

2. The method of claim 1, wherein making the determination based at least on the comparison comprises:

determining that the second base station supports a higher maximum number of MIMO layers per UE than the first base station; and based at least on the determining that the second base station supports the higher maximum number of MIMO layers per UE, determining that the UE should be served by the second base station rather than by the first base station.

3. The method of claim 2, wherein the determining that the UE should be served by the second base station rather than by the first base station occurs when the UE has stronger detected coverage from the first base station than from the second base station.

4. The method of claim 2, carried out by at least the UE.

5. The method of claim 4, further comprising:

receiving by the UE from the first base station a first indication of the maximum number of MIMO layers that the first base station supports per UE;

receiving by the UE from the second base station a second indication of the maximum number MIMO layers that the second base station supports per UE; and performing by the UE the comparison based on the received first indication and received second indication.

6. The method of claim 5, wherein receiving the first indication comprises receiving the first indication in a broadcast from the first base station, and wherein receiving the second indication comprises receiving the second indication in a broadcast from the second base station.

7. The method of claim 4, carried out when the UE is seeking initial connectivity, wherein causing the UE to be served in accordance with the determination comprises the UE establishing an initial connection with the second base station rather than with the first base station.

8. The method of claim 4, carried out when the UE is served by one of the first base station or the second base station, wherein the determination of whether the UE should be served by the first base station or rather by the second base station comprises a determination of whether the UE should hand over between the first base station and the second base station.

9. The method of claim 4, carried out when the UE is served by a third base station, wherein the determination of whether the UE should be served by the first base station or rather by the second base station comprises a determination of whether the UE should hand over from being served by the third base station to being served by the first base station or rather should hand over from being served by the third base station to being served by the second base station.

10. The method of claim 3, carried out by at least a base station currently serving the UE.

11. The method of claim 10, wherein the base station currently serving the UE is one of the first base station or second base station, wherein the making the determination comprises determining whether the UE should hand over between the first base station and the second base station.

12. The method of claim 10, wherein the base station currently serving the UE is a third base station, wherein making the determination comprises determining whether the UE should hand over from being served by the third base station to being served by the first base station or rather should hand over from being served by the third base station to being served by the second base station.

13. The method of claim 10, further comprising using, by the base station currently serving the UE, neighbor data to facilitate performing the comparison.

14. A user equipment device (UE) comprising:
a user interface;
a wireless communication interface; and
a controller configured to control selection by the UE of a base station to serve the UE by carrying out operations including:
when the UE is within coverage of a first base station and within coverage of a second base station, making a determination of whether the UE should be served by the first base station or rather by the second base station, wherein the determination is based at least on a comparison of (i) maximum number of multiple-input-multiple-output (MIMO) layers that the first base station supports per UE with (ii) maximum number of MIMO layers that the second base station supports per UE, and
causing the UE to be served in accordance with the determination.

15. The UE of claim 14, wherein the operations further include
receiving a first indication of the maximum number of MIMO layers that the first base station supports per UE;
receiving a second indication of the maximum number MIMO layers that the second base station supports per UE; and
performing the comparison based on the received first indication and received second indication,
wherein making the determination based at least on the comparison comprises (i) determining that the second base station supports a higher maximum number of MIMO layers per UE than the first base station and (ii) based at least on the determining that the second base station supports the higher maximum number of MIMO layers per UE, determining that the UE should be served by the second base station rather than by the first base station.

16. The UE of claim 14, wherein the controller is configured to carry out the operations to facilitate initial base station selection by the UE.

17. The UE of claim 14, wherein the controller is configured to carry out the operations to facilitate a handover decision for the UE.

18. The UE of claim 14, wherein the controller comprises at least one processing unit, non-transitory data storage, and program instructions stored in the non-transitory data storage and executable by the at least one processing unit to carry out the operations.

19. A base station comprising:
an antenna array comprising a plurality of antennas for communicating over an air interface, wherein the air interface defines resources for carrying data over the air interface; and
a controller configured to control handover of a user equipment device (UE) served by the base station, by carrying out operations including:
when the UE is within coverage of the base station and within coverage of at least one neighboring base station, making a handover determination based on consideration of maximum number of multiple-input-multiple-output (MIMO) layers supported per UE, and
controlling handover of the UE in accordance with the handover determination.

20. The base station of claim 19, wherein the controller comprises at least one processing unit, non-transitory data storage, and program instructions stored in the non-transitory data storage and executable by the at least one processing unit to carry out the operations.

* * * * *